United States Patent
Ha et al.

(10) Patent No.: US 7,927,728 B2
(45) Date of Patent: Apr. 19, 2011

(54) BATTERY MODULE INTERFACE

(75) Inventors: Jin Woong Ha, Daejeon (KR); Jeeho Kim, Daejeon (KR); Yongshik Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/441,443

(22) PCT Filed: Sep. 6, 2007

(86) PCT No.: PCT/KR2007/004292
§ 371 (c)(1),
(2), (4) Date: Apr. 23, 2010

(87) PCT Pub. No.: WO2008/035873
PCT Pub. Date: Mar. 27, 2008

(65) Prior Publication Data
US 2010/0247979 A1    Sep. 30, 2010

(30) Foreign Application Priority Data
Sep. 18, 2006  (KR) ........................ 10-2006-0089899

(51) Int. Cl.
*H01M 2/20* (2006.01)
*H01M 2/34* (2006.01)
(52) U.S. Cl. ......................................... 429/61; 429/158

(58) Field of Classification Search ................... 429/61, 429/62, 156, 158, 159; 361/762, 767, 770
See application file for complete search history.

(56) References Cited

U.S. PATENT DOCUMENTS

| | | | | |
|---|---|---|---|---|
| 3,351,816 A | * | 11/1967 | Sear et al. ................. | 361/762 X |
| 4,346,151 A | | 8/1982 | Uba et al. | |
| 5,745,333 A | * | 4/1998 | Frankeny et al. ......... | 361/762 X |
| 6,016,254 A | * | 1/2000 | Pfaff ........................ | 361/767 X |
| 7,014,946 B2 | | 3/2006 | Partington et al. | |
| 7,504,178 B2 | * | 3/2009 | Shimamura et al. .......... | 429/159 |
| 2007/0059587 A1 | * | 3/2007 | Kishi et al. ...................... | 429/62 |

OTHER PUBLICATIONS

International Search Report, PCT/KR2007/004292, (Dec. 18, 2007).

* cited by examiner

*Primary Examiner* — Stephen J. Kalafut
(74) *Attorney, Agent, or Firm* — Lerner, David, Littenberg, Krumholz & Mentlik, LLP

(57) ABSTRACT

Disclosed herein are a battery module interface including a printed circuit board provided at the front and rear thereof with power connectors and communication connectors for connection with a battery module and an external circuit and a sheathing plate coupled to the printed circuit board such that the rear connectors are exposed to the outside, a battery module having the battery module interface mounted thereto, and a middle- or large-sized battery pack including a plurality of battery modules.

15 Claims, 6 Drawing Sheets

BATTERY MODULE INTERFACE

CROSS REFERENCE TO RELATED APPLICATIONS

The present application is a national phase entry under 35 U.S.C. §371 of International Application No. PCT/KR2007/004292, filed Sep. 6, 2007, published in English, which claims the benefit of Korean Patent Application No. 10-2006-0089899, filed Sep. 18, 2006. The disclosures of said applications are incorporated by reference herein.

FIELD OF THE INVENTION

The present invention relates to a battery module interface that is capable of effectively accomplishing the electrical connection and communication between battery modules, and, more particularly, to a battery module interface including a printed circuit board having power connectors and a communication connector formed at the rear thereof for connection with a battery module and power connectors and a communication connector formed at the front thereof for connection with an external circuit, and a sheathing plate surrounding the printed circuit board from the rear of the printed circuit board such that the rear connectors are exposed to the outside. Also, the present invention relates to a battery module having the battery module interface mounted thereto, and a middle- or large-sized battery pack including a plurality of battery modules.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide the output and capacity required by a specific apparatus or device, it is necessary for the middle- or large-sized battery module to be constructed in a structure in which a plurality of battery cells are electrically connected in series or parallel with each other, and the battery cells are stable against an external force.

Consequently, when a middle- or large-sized battery module is constructed using a plurality of battery cells, a plurality of members for mechanical coupling and electrical connection between the battery cells are generally needed, and, as a result, a process for assembling the mechanical coupling and electrical connection members is very complicated. Furthermore, there is needed a space for coupling, welding, or soldering the mechanical coupling and electrical connection members, with the result that the total size of the system is increased. The increase in size of the system is not preferred in the aspect of the spatial limit of an apparatus or device in which the middle- or large-sized battery module is mounted. Furthermore, the middle- or large-sized battery module must be constructed in a more compact structure in order that the middle- or large-sized battery module is effectively mounted in a limited inner space, such as a vehicle.

Consequently, there is a high necessity for a battery module assembly that is more compact, is structurally stable, and is capable of effectively accomplishing the electrical connection and communication between battery modules constituting the battery module assembly, as previously described.

SUMMARY OF THE INVENTION

Therefore, the present invention has been made to solve the above problems, and other technical problems that have yet to be resolved.

Specifically, it is an object of the present invention to provide a battery module interface having a compact structure in which the battery module interface is stably mounted in a limited space, such as a vehicle and that is capable of effectively accomplishing the electrical connection and communication between battery modules.

It is another object of the present invention to provide a battery module having the battery module interface mounted thereto and a middle- or large-sized battery pack including a plurality of battery modules.

In accordance with one aspect of the present invention, the above and other objects can be accomplished by the provision of a battery module interface mounted to one side of a battery module including a plurality of plate-shaped secondary battery cells ('battery cells'), which can be charged and discharged, for performing the electrical connection between the battery module and an external circuit, wherein the battery module interface includes a printed circuit board having power connectors and a communication connector ('rear connectors') formed at the rear thereof for connection with the battery module and power connectors and a communication connector ('front connectors') formed at the front thereof for connection with the external circuit, and a sheathing plate having an opening, through which the rear connectors of the printed circuit board are exposed to the outside, the sheathing plate being coupled to the printed circuit board such that the sheathing plate surrounds the printed circuit board from the rear of the printed circuit board.

The power connectors and the communication connector formed at the rear of the printed circuit board are electrically connected and mechanically coupled to the battery module in a direct fashion. Consequently, the power connectors and the communication connector formed at the rear of the printed circuit board may be adjacent to each other such that the connection and coupling between the battery module interface and one side of the battery module is easily performed.

The power connectors formed at the front of the printed circuit board include a cathode connector and an anode connector. The connection between the power connectors and the external circuit may be accomplished by soldering, mechanical coupling, or welding. Preferably, therefore, the cathode connector and the anode connector are spaced a large distance from each other such that the connection between the power connectors and the external circuit is easily performed.

The sheathing plate may be constructed in a structure in which, when the battery module interface is mounted to the battery module, the sheathing plate is bent in the direction opposite to the battery module, i.e., such that the sheathing plate covers opposite sides of the printed circuit board. This is to protect the printed circuit board from external impacts, and, at the same time, to disturb the heat dissipation of the heat dissipation structure.

In accordance with another aspect of the present invention, there is provided a battery module having the battery module interface mounted thereto. The battery module may include plates between which a plurality of unit cells, i.e., battery cells that can be charged and discharged, are stacked and a circuit unit for controlling the operation of the unit cells.

The plates are not particularly restricted so long as the plates are constructed in a structure in which the unit cells are stacked. The plates may be constructed in a case structure (an upper case and a lower case) having a receiving part corresponding to the size of the battery cells such that the battery cells are easily mounted in the receiving part. Preferably, the cases are constructed in a separate structure in which the cases cover the top and bottom of the stacked battery cells, respectively.

In a preferred embodiment, the battery module according to the present invention includes a rectangular lower case including an upper end receiving part in which a plurality of battery cells are sequentially stacked, a rectangular upper case including a lower end receiving part for covering the top of the battery cells stacked on the lower case, a first circuit unit for electrically connecting the stacked battery cells to each other, the first circuit unit including a sensing board assembly for detecting the voltage and/or current of the battery cells, a second circuit unit electrically connected to the first circuit unit, the second circuit unit including a main board assembly for controlling the overall operation of the battery module, and a third circuit unit electrically connected to the second circuit unit, the third circuit unit being connected to an external output terminal while preventing the overcurrent.

The battery module according to the present invention is constructed generally in a compact structure. Specifically, the width of the completed battery module is almost equal to or slightly greater than that of each unit cell. The length of the battery module is greater, by the widths of the first circuit unit and the third circuit unit mounted to the opposite sides of the battery module, than that of each unit cell. The thickness of the battery module is the sum of the thickness of the stacked unit cells, the thickness of the second circuit unit, and the thicknesses of the upper and lower cases. Consequently, the battery module according to the present invention has a size less than that of any conventional battery modules, and therefore, the battery module according to the present invention is effectively mounted in an external apparatus or device to which the battery module according to the present invention will be applied.

Each unit cell is not particularly restricted so long as the unit cell is a secondary battery that can be charged and discharged. For example, a lithium secondary battery, a nickel-metal hydride (Ni—MH) battery, a nickel-cadmium (Ni—Cd) battery may be used as the unit cell. Among them, the lithium secondary battery is preferably used as the unit cell because the lithium secondary battery exhibits a high output to weight ratio. Based on its shape, the lithium secondary battery may be classified as a cylindrical battery, a prismatic battery, or a pouch-shaped battery. Among them, the prismatic battery or the pouch-shaped battery are preferably used as the unit cell because the prismatic battery or the pouch-shaped battery can be stacked with high integration. More preferably, the pouch-shaped battery is used as the unit cell because the weight of the pouch-shaped battery is very small.

In the battery module according to the present invention, the upper case and the lower case are separated from each other. Consequently, when the capacity and output of the battery module need to be changed according to circumstances, it is possible to add or remove the unit cells between the upper case and the lower case, and therefore, the flexible design of the battery module is possible.

The overall size of the upper case and the lower case is approximately equivalent to that of each unit cell. Consequently, the upper end receiving part of the lower case and the lower end receiving part of the upper case, in which the unit cells are received, correspond to the size of the cell body of each unit cell.

The first circuit unit is mounted to the front of the battery module adjacent to electrode leads of the unit cells. The first circuit unit includes connection terminals for connecting the unit cells in parallel or series with each other, the sensing board assembly of the first circuit unit receives voltage and current signals from the respective unit cells and detects the temperature of the battery. The temperature of the battery may be measured by the sensing board assembly as the overall temperature of the battery module.

The construction of the connection members is not particularly restricted so long as the unit cells are connected in parallel or series with each other by the connection members. Preferably, a safety element, for interrupting current when overcurrent or overheat is generated, is connected between the connection members. The safety element may be, for example, a fuse, a bimetal, or a positive temperature coefficient (PTC) element.

Preferably, the sensing board assembly is made of a printed circuit board (PCB), and the sensing board assembly is electrically connected to the respective unit cells.

The unit cells are electrically connected to the second circuit unit, which is mounted at the lower end receiving part of the upper case, via the first circuit unit. The operation of the battery module is controlled by the main board assembly of the second circuit unit.

The third circuit unit, which is electrically connected to the second circuit unit, is mounted to the other side opposite to the side of the battery module where the first circuit unit is mounted. The third circuit unit is the final element of the battery module, which is connected to an external device for controlling the overcharge, overdischarge, and overcurrent of the unit cells. The control of the overcharge, overdischarge, and overcurrent of the unit cells may be performed by a switching element included in the third circuit unit.

Preferably, the main board assembly is made of a PCB. Consequently, the main board assembly of the second circuit unit has a specific strength sufficient to protect the unit cells against the external impacts. According to circumstances, therefore, a safety member, including the second circuit unit, may be mounted only to the upper case.

The battery module is constructed in a structure in which the circuit units for controlling the operation of the unit cells are connected to each other such that the circuit units surround the battery module. Consequently, the overall size of the battery module is greatly reduced.

The third circuit unit includes a switching element for controlling the overcurrent during the charge and discharge of the battery cells, and the third circuit unit is mounted at the rear of the battery module opposite to electrode terminals of the battery cells.

The switching element is connected in series to the unit cells, constituting the battery module, for controlling the current flowing in the unit cells. The switching element is connected to a protection circuit for detecting the voltage and/or the current of the unit cells to control the switching element. The switching element is not particularly restricted so long as the switching element controls overcharge, overdischarge, and overcurrent of the unit cells. For example, an FET element or a transistor may be used as the switching element. Preferably, the FET element is used as the switching element.

As described above, the third circuit unit includes the switching element for controlling the overcurrent during the charge and discharge of the battery cells. The switching element is connected to a control circuit for detecting the voltage and/or the current of the unit cells to control the switching element. The switching element is controlled to be on or off according to a signal outputted from the control circuit.

The battery module interface is mounted to the rear of the battery module where the third circuit unit is located. The battery module is provided at one side of the rear thereof with a connection member including power connectors and a communication connector ('module connectors') connected to the rear connectors of the battery module interface, whereby the electrical connection and mechanical coupling between the battery module and the battery module interface are accomplished.

The connection member is constructed in a structure in which the module connectors are mounted on a 'ㄱ'-shaped insulative member. Specifically, the connection member is constructed in a structure in which the module connectors are mounted on a 'ㄱ'-shaped supporting member toward the battery module interface, and the supporting member is provided at the rear thereof with coupling protrusions, by which the supporting member is mechanically coupled to the battery module. Also, the module connectors are coupled to the connectors of the battery module interface. Consequently, the third circuit unit may be located at one side of the rear of the battery module, and the connection member may be spaced a predetermined distance from the third circuit unit. Preferably, the connection member is located at least at the same height as the outermost protruding portion at the front of the battery module.

The first circuit unit is mounted to the front of the battery module adjacent to the electrode leads of the unit cells. The first circuit unit includes an anode and a cathode. The anode and the cathode of the first circuit unit are electrically connected to the anode connector and the cathode connector of the connection member. The connection structure between the anode and the cathode of the first circuit unit and the anode connector and the cathode connector of the connection member is not restricted. Preferably, however, the connection between the anode and the cathode of the first circuit unit and the anode connector and the cathode connector of the connection member is accomplished by wires. During the electrical connection between the first circuit unit and the power connectors, at least one connection route passes through the third circuit unit, whereby it is possible to control the overvoltage and/or overcurrent of the battery module. Preferably, the anode of the first circuit unit is connected to the anode connector of the connection member by a wire, and the cathode of the first circuit unit is connected to the cathode connector of the connection member, via the third circuit unit, by a wire.

Also, a communication port, for voltage detection, of the sensing board assembly of the first circuit unit is connected to the communication connector of the connection member, via the second circuit unit, whereby it is possible to sense and control the overall voltage and/or current and temperature of the battery module as well as the voltage and/or current and temperature of the respective stacked battery cells.

In accordance with a further aspect of the present invention, there is provided a middle- or large-sized battery system having a high output and large capacity, which includes a plurality of battery modules. The battery modules may be connected in series and/or parallel with each other through their battery module interfaces. Consequently, the flexible design of the battery system according to a desired output and capacity is possible.

The range of the high output and large capacity is not particularly restricted. For example, the battery system according to the present invention may be used as a power source for vehicles, such as electric bicycles (E-bike), electric motorcycles, electric vehicles, and hybrid electric vehicles, a charging and discharging power source for uninterruptible power supplies (UPS), idle reduction devices, and energy storage devices, or a power source for various applications and products, including industrial or domestic apparatuses. Preferably, the battery system according to the present invention is used as a charging and discharging power source for electric vehicles by virtue of its compact structure.

BRIEF DESCRIPTION OF THE DRAWINGS

The above and other objects, features and other advantages of the present invention will be more clearly understood from the following detailed description taken in conjunction with the accompanying drawings, in which.

Figure 1:
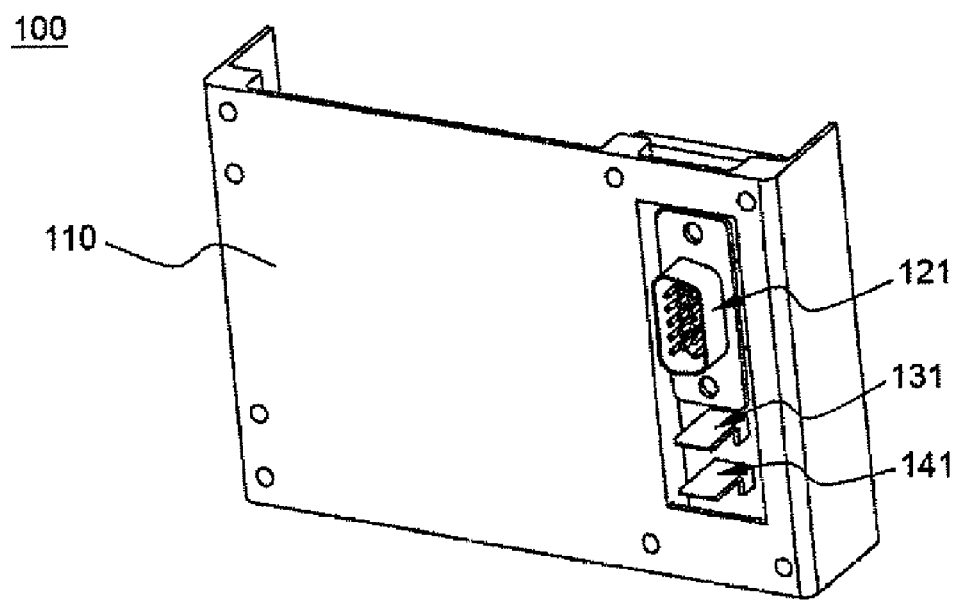
FIGS. 1 and 2 are perspective views illustrating the structure of a battery module interface according to a preferred embodiment of the present invention.

| <Description of Main Reference Numerals of the Drawings> |
| --- |
| 100: battery module interface |
| 200: battery module |
| 210: unit cell |
| 300: first circuit unit |
| 400: second circuit unit |
| 500: third circuit unit |
| 600: battery module assembly |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 2:
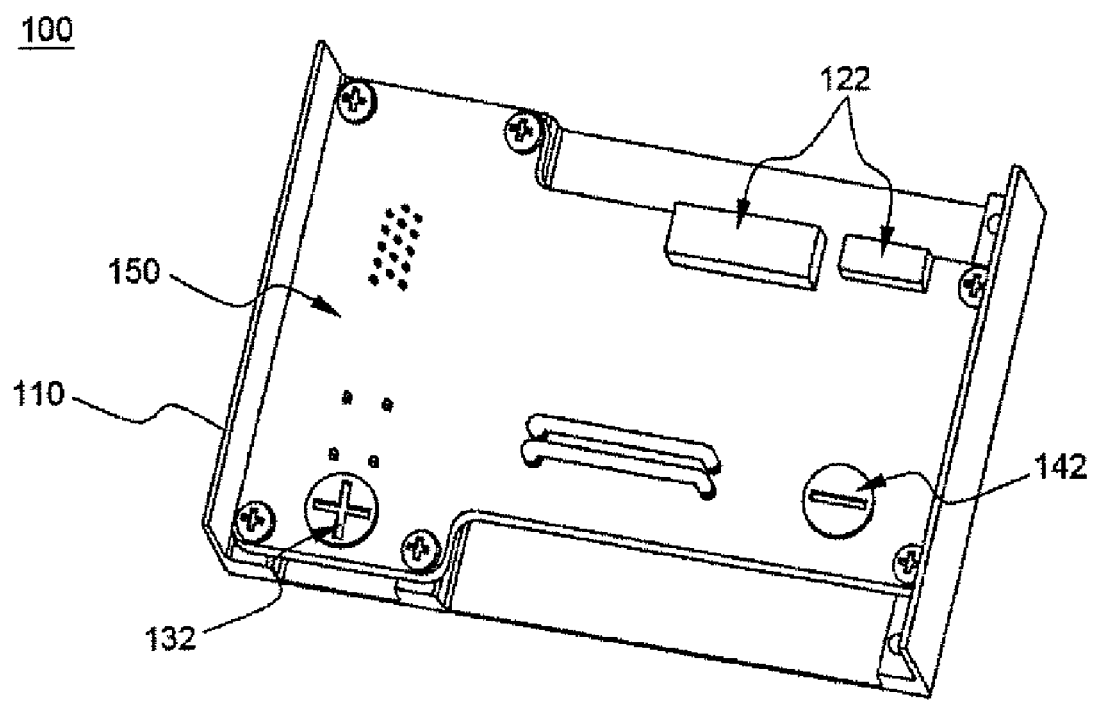

FIGS. 1 and 2 are perspective views illustrating the rear and front of a battery module interface according to a preferred embodiment of the present invention, respectively.

Referring to FIGS. 1 and 2, the battery module interface 100 is constructed in a structure in which a printed circuit board 150 and a sheathing plate 110 are coupled to each other, power connectors 131 and 141 and a communication connector 121 ('rear connectors'), for connection with a battery module, are formed at the rear of the printed circuit board 150, and power connectors 132 and 142 and a communication connector 122 ('front connectors'), for connection with an external circuit, are formed at the front of the printed circuit board 150.

The rear connectors include the power connectors 131 and 141 and the communication connector 121. The rear connectors are electrically connected and mechanically coupled to the battery module in a direct fashion.

The front connectors are connected to the external circuit. Especially, the power connectors 132 and 142, i.e., the cathode connector 132 and the anode connector 142, are spaced a large distance from each other such that the connection between the power connectors 132 and 142 and the external circuit is easily performed.

The sheathing plate 110 is bent such that the sheathing plate 110 covers opposite sides of the printed circuit board 150. Also, the sheathing plate 110 has an opening, through which the rear connectors 121, 131, and 141 of the printed circuit board 150 are exposed to the outside.

Figure 3:
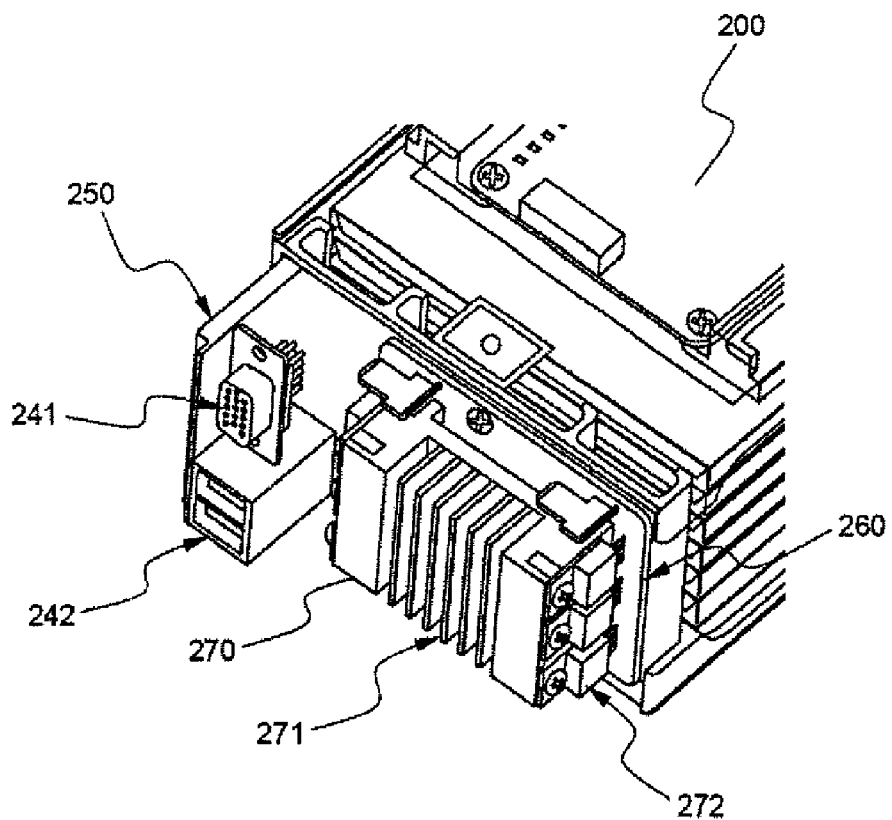
FIG. 3 is a partially enlarged view illustrating a battery module before the battery module interface is mounted to the battery module.

FIG. 3 is a partially enlarged rear perspective view of a battery module.

Referring to FIG. 3, which illustrates the rear of the battery module 200, a switching board is constructed in a structure in which a rectangular heat dissipation structure 270 is mounted on a printed circuit board (PCB) 260 while the rectangular heat dissipation structure 270 is connected to six field effect transistor (FET) elements 272, which are switching elements.

The heat dissipation structure 270 is constructed in a structure in which the FET elements 272 are coupled to opposite side frames of the heat dissipation structure 270, and a plurality of heat dissipation ribs 271 protrude upward from a main frame integrally connected to the side frames. At the left side of the heat dissipation structure 270 is formed a connector supporting member 250, which extends in the longitudinal direction of the battery module 200. On the connector supporting member 250 are mounted a communication connector 241 and a power connector 242, through which the battery module 200 is connected to the rear connectors of the battery module interface.

Figure 4:
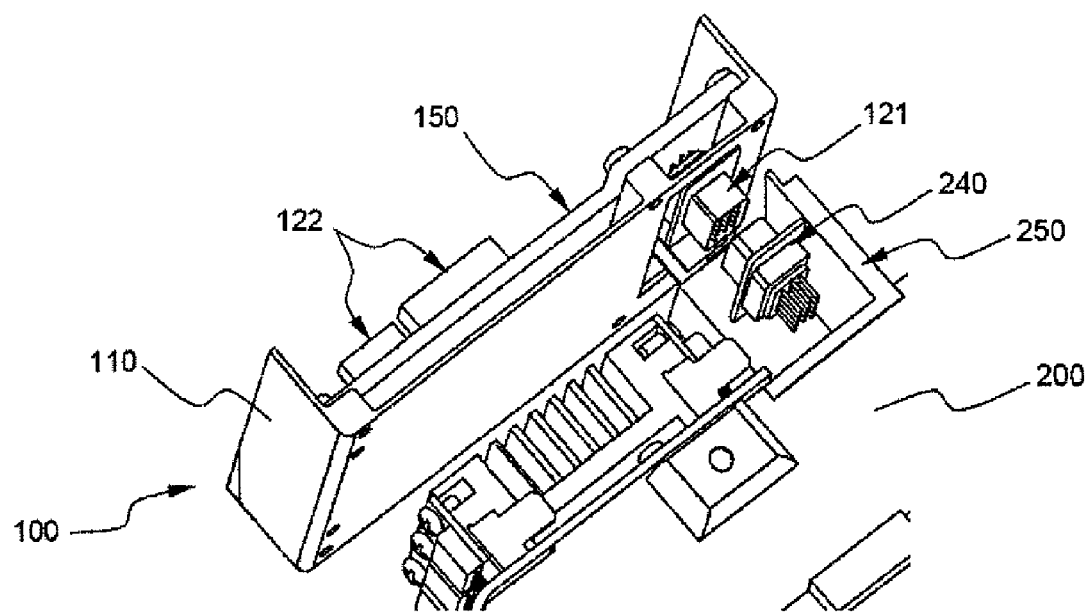
FIGS. 4 and 5 are partially enlarged views illustrating a process for mounting the battery module interface of FIG. 1 to one side of the battery module.
Figure 5:
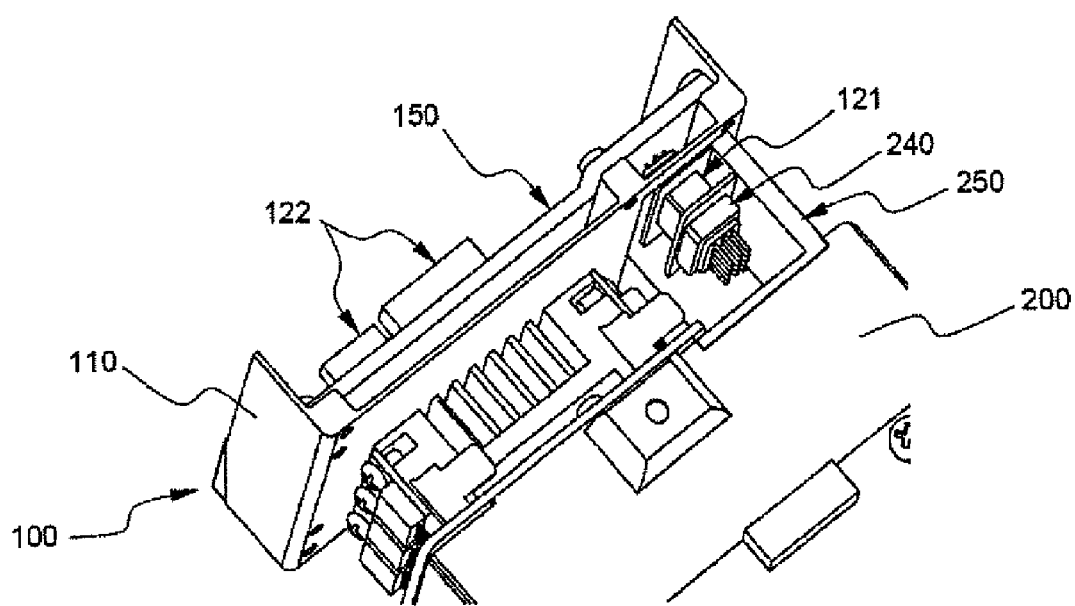

FIGS. 4 and 5 are partially enlarged views illustrating a process for mounting the battery module interface according to the preferred embodiment of the present invention to one side of the battery module.

Referring to these drawings, the rear connectors 121, 131, and 141 of the battery module interface 100 are electrically connected and mechanically coupled to the battery module in a direct fashion. The battery module interface 100 is mounted to the rear of the battery module at which a third circuit unit of the battery module 200 is mounted. At one side of the rear of the battery module, the power connectors (not shown) and the communication connector 240 ('module connectors'), which are connected to the rear connectors 121, 131, and 141 of the battery module interface 100, are mounted on the '¬'-shaped connector supporting member 250. The electrical connection and mechanical coupling between the battery module 200 and the battery module interface 100 are accomplished by the module connectors. FIG. 5 illustrates the battery module interface 100 mounted to the rear of the battery module 200.

Figure 6:
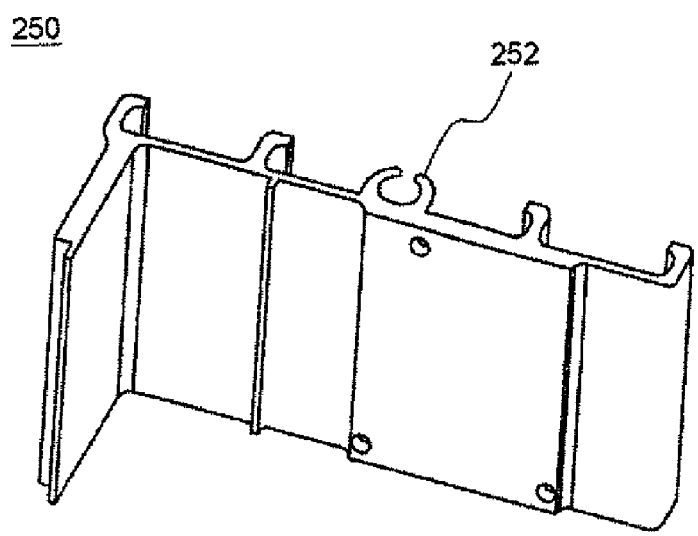
FIGS. 6 and 7 are perspective views illustrating a supporting member having a battery module connector mounted thereon.
Figure 7:
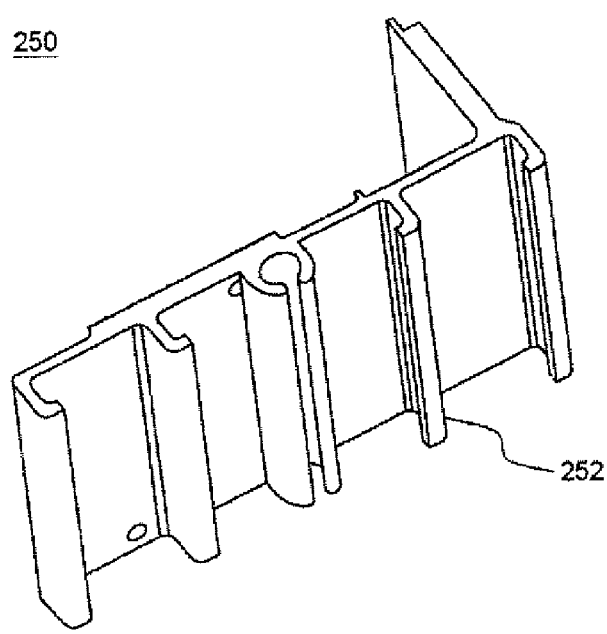

FIGS. 6 and 7 are perspective views of the connector supporting member.

Referring to these drawings, the connector supporting member 250 is an insulative member formed generally in the shape of '¬'. The module connectors (not shown) are mounted to the inside of the connector supporting member, which is directed toward the battery module interface (not shown). The connector supporting member 250 is provided at the rear thereof with coupling protrusions 252, by which the connector supporting member 250 is mechanically coupled to the battery module (not shown).

Figure 8:
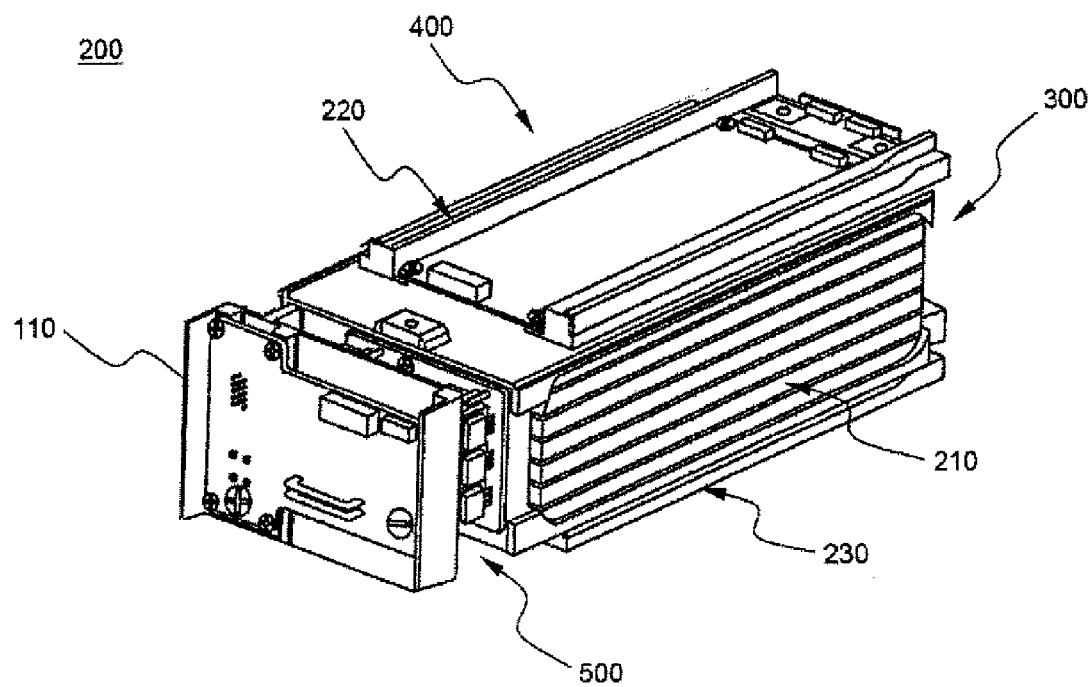
FIG. 8 is a perspective view illustrating the battery module interface mounted to one side of the battery module.

FIG. 8 is a perspective view illustrating the battery module interface according to the preferred embodiment of the present invention mounted to the battery module.

Referring to FIG. 8, the battery module 200 includes an upper case 220, a lower case 230, a plurality of unit cells 210, a first circuit unit 300, a second circuit unit 400, and a third circuit unit 500. The unit cells 210 are stacked between the upper case 220 and the lower case 230, which are separated from each other. The first circuit unit 300 is located at the front of the battery module 200, the second circuit unit 400 is located at the bottom of the battery module 200, and the third circuit unit 500 is located at the rear of the battery module 200.

Since the upper case 220 and the lower case 230 are separated from each other, the number of the unit cells 210, which are stackable, is not limited by the upper case 220 or the lower case 230. Consequently, it is possible to easily design the battery module 200, such that the battery module 200 has a desired electrical capacity and output, by modifying the first circuit unit 300 and the third circuit unit 500 depending upon the number of the stacked unit cells 210. Also, the unit cells 210 are exposed to the outside, and therefore, heat dissipation is efficiently accomplished during the charge and discharge of the unit cells 210.

The first circuit unit 300 is mounted to one side of the battery module 200 adjacent to electrode terminals of the unit cells 210. The first circuit unit 300 includes a sensing board assembly for connecting the unit cells 210 in parallel or series with each other and detecting the voltages of the respective unit cells 200 according to the present invention.

The unit cells 210 are electrically connected to the second circuit unit 400, which is mounted at the bottom of the upper case 220, via the first circuit unit 300. The operation of the battery module 200 is controlled by a main board assembly of the second circuit unit 400.

The third circuit unit 500, which is electrically connected to the second circuit unit 400, is mounted to the other side opposite to the side of the battery module 200 where the first circuit unit 300 is mounted. The third circuit unit 500 is the final element of the battery module 200, which is connected to an external device (not shown) for controlling the overcharge, overdischarge, and overcurrent of the unit cells. The control of the overcharge, overdischarge, and overcurrent of the unit cells may be performed by the switching elements (not shown), such as the FET elements, included in the third circuit unit 500.

The battery module interface 100 is mounted to the rear of the battery module 200 where the third circuit unit 500 of the battery module 200 is located. An anode of the first circuit unit 300 is connected to the anode connector of the battery module interface connection member by a wire (not shown), and a cathode of the first circuit unit 300 is connected to the cathode connector of the battery module interface connection member, via the third circuit unit, by a wire.

Also, a communication port, for voltage detection, of the sensing board assembly of the first circuit unit 300 is connected to the communication connector of the battery module interface connection member, via the second circuit unit.

Figure 9:
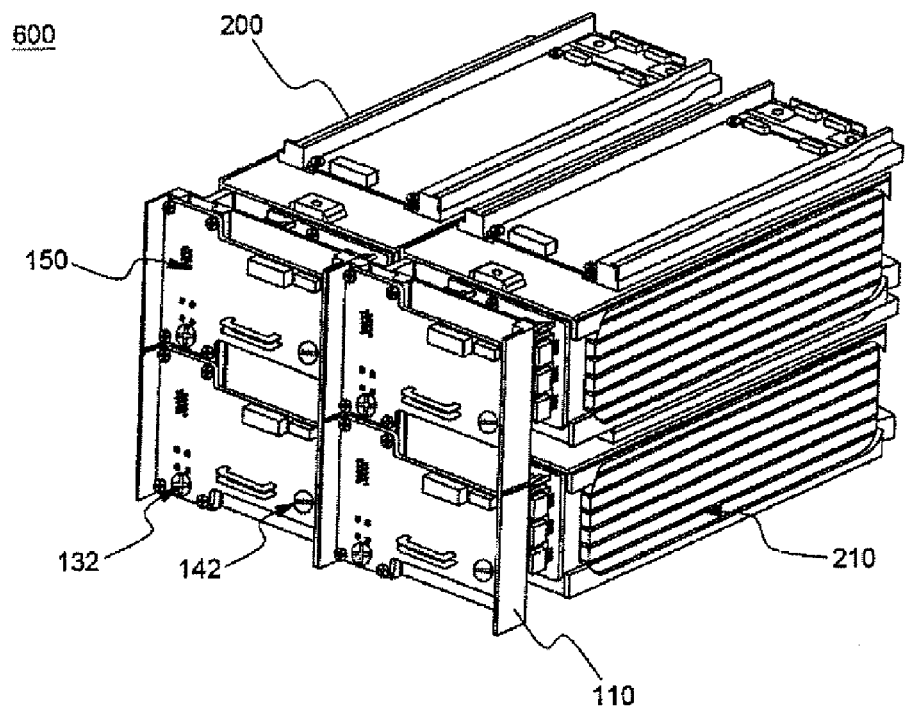
FIG. 9 is a perspective view illustrating a plurality of stacked battery modules, one of which is shown in FIG. 8.

FIG. 9 is a perspective view illustrating a plurality of stacked battery modules, one of which is shown in FIG. 8. It is possible to stack two or more battery modules 200 in the height direction and/or in the lateral direction. The structure of FIG. 9 is one example of various structures that can be embodied according to the present invention. Consequently, it should be interpreted that portions which can be easily invented, by those skilled in the art to which the present invention pertains, based on the disclosure of the present invention, fall under the protection scope of the present invention.

For example, the battery module interface according to the present invention may be mounted to each battery module, whereby the degree of freedom in arrangement of the battery modules is maximized. According to circumstances, however, the battery module interface according to the present invention may be mounted to two or more integrated battery modules according to the arrangement pattern of the battery modules. Alternatively, one battery module interface may be mounted to all the integrated battery modules. When the battery module interface according to the present invention may be mounted to the two or more integrated battery modules, as described above, the electrical connection between the battery modules may be performed by the printed circuit board on the battery module interface without using additional wires. Consequently, it is possible to accomplish both the electrical connection and the mechanical coupling between a plurality of battery modules by mounting one battery module interface to the plurality of battery modules.

The battery modules 200, each of which includes a plurality of stacked battery cells 210, are stacked such that two battery modules 200 are stacked in the vertical direction and two battery modules 200 are stacked in the lateral direction. The electrical connection between the battery modules 200 is accomplished by the connection between the cathode connectors 132 and the anode connectors 142 of the battery module interfaces 100. The detailed examples of the electrical connection between the battery modules will be described below with reference to FIGS. 10 to 12.

Figure 10:
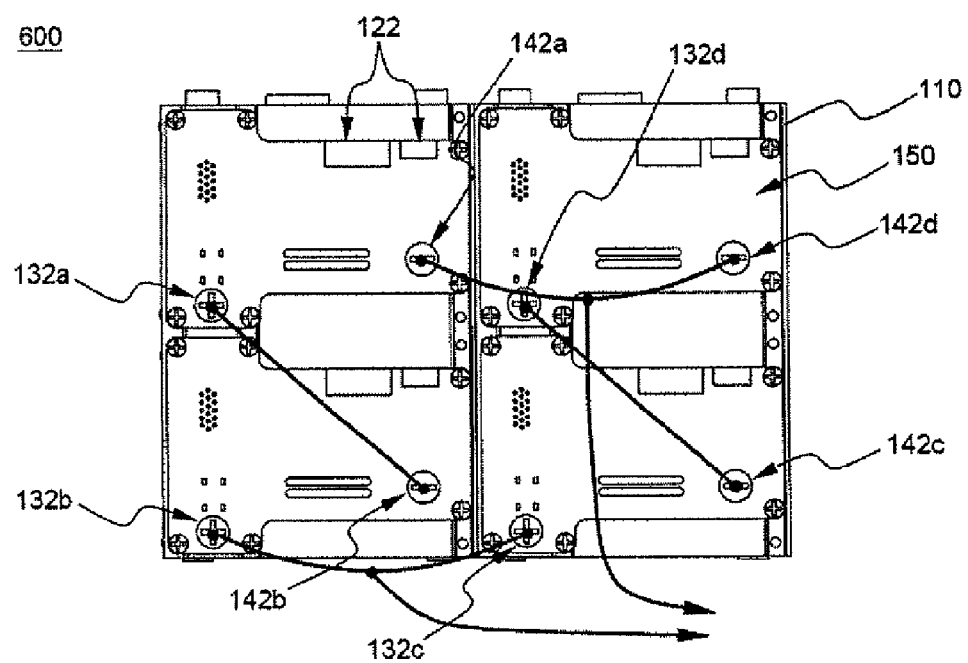
FIGS. 10 to 12 are typical views illustrating various electrical connections between the stacked battery modules of FIG. 9.
Figure 11:
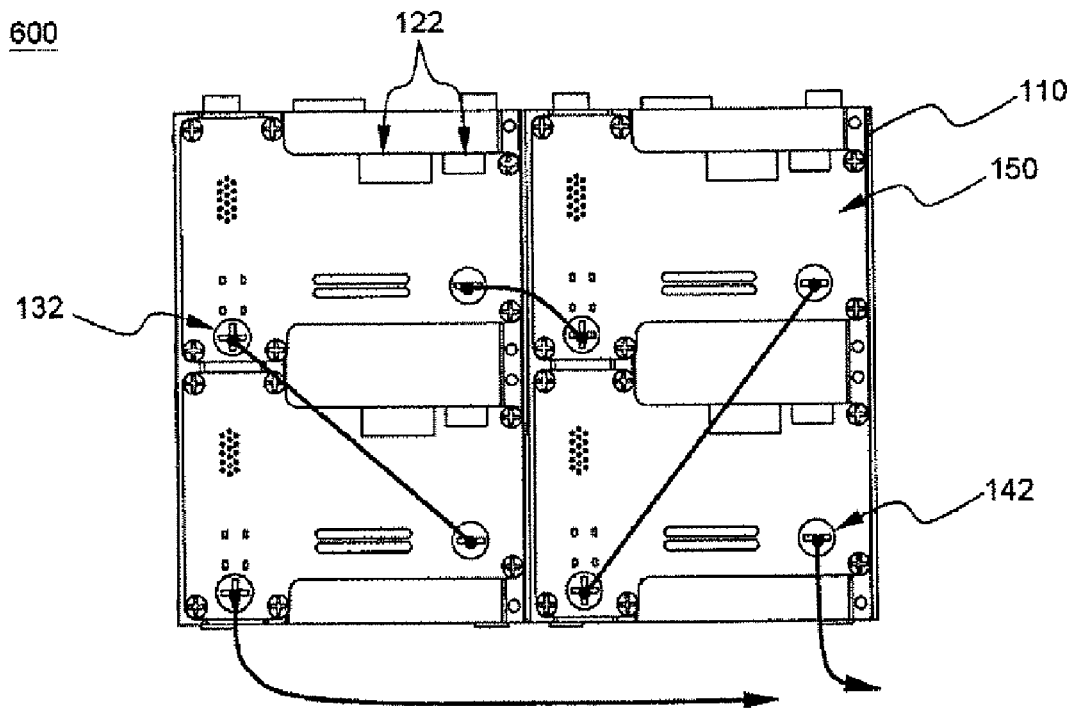
Figure 12:
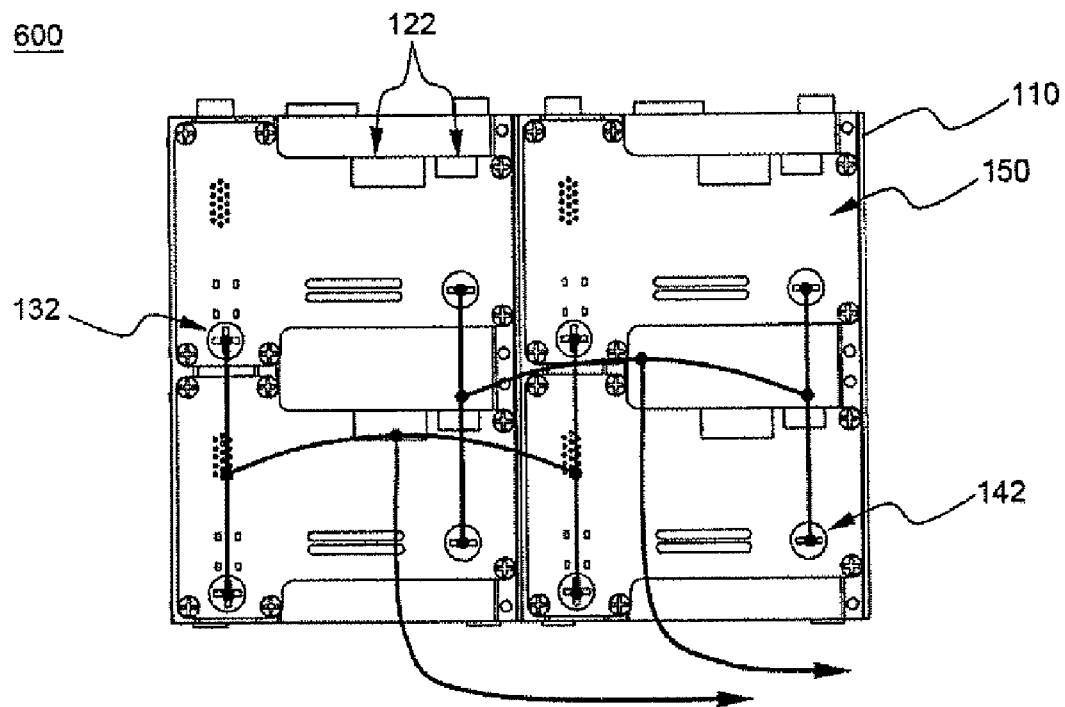

FIGS. 10 to 12 are front views typically illustrating various electrical connection structures of a battery module assembly according to a preferred embodiment of the present invention.

According to the circumstances, the capacity and output of the battery module according to the present invention may be flexibly changed by changing the electrical connection structure of the battery module interface. The electrical connection between the battery modules 200 is accomplished by the electrical connection between the cathode connectors 132 and the anode connectors 142 of the battery module interfaces 100.

Referring first to FIG. 10, the cathode connectors 132 and the anode connectors 142 are connected to each other (132a and 142b, 132d and 132c) for the battery modules 200 stacked in the height direction. For the battery modules 200 stacked in the lateral direction, connectors having the same polarity are connected to each other (132b and 132c, 142s and 142d). In this case, the connection line between the anode connector 142a and 142d of the upper battery modules 200 and the connection line between the cathode connectors 132b and 132c of the lower battery modules 200 serve as the external output terminals of the battery module assembly 600. As a result, the battery module assembly 600 is constructed in a structure in which two battery modules 200 are connected in series with each other, and two battery modules 200 are connected in parallel with each other (2S2P).

FIG. 11 illustrates a structure in which four battery modules 200 are connected in series with each other. Specifically, the cathode connectors 132 and the anode connectors 142 of the four battery modules 200 are connected to each other. In this case, the cathode connector 132 of the lower left battery module 200 and the anode connector 142 of the lower right battery module 200 serve as the external output terminals of the battery module assembly 600.

FIG. 12 illustrates a structure in which four battery modules 200 are connected in parallel with each other. Specifically, the electrode connectors, having the same polarity, of the four battery modules 200 are connected to each other, and the connection line between the cathode connectors and the connection line between the anode connectors are connected in parallel with each other. As a result, the battery module assembly 600 is constructed in a structure in which all the four battery modules 200 are connected in parallel with each other.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module interface according to the present invention effectively accomplishes the electrical connection and communication between the battery modules. Furthermore, the battery module interface according to the present invention is constructed in a compact structure in which the battery module interface is stably mounted in a limited space, such as a vehicle.

Consequently, the battery module, having the battery module interface according to the present invention mounted thereto, is applicable to middle- or large-sized battery modules, such as electric bicycles, electric vehicles, hybrid electric vehicles, uninterruptible power supplies (UPS), idle reduction devices, and energy storage devices.

What is claimed is:

1. A battery module comprising:
    a battery module interface mounted to one side of the battery module comprising a plurality of plate-shaped secondary battery cells, which can be charged and discharged, for performing the electrical connection between the battery module and an external circuit, wherein the battery module interface comprises:
    a printed circuit board having power connectors and a communication connector ('rear connectors') formed at the rear thereof for connection with the battery module and power connectors and a communication connector ('front connectors') formed at the front thereof for connection with the external circuit, and
    a sheathing plate having an opening, through which the rear connectors of the printed circuit board are exposed to the outside, the sheathing plate being coupled to the printed circuit board such that the sheathing plate surrounds the printed circuit board from the rear of the printed circuit board.

2. The battery module according to claim 1, wherein the power connectors and the communication connector formed at the rear of the printed circuit board are adjacent to each other such that the connection and coupling between the battery module interface and one side of the battery module is easily performed.

3. The battery module according to claim 1, wherein the power connectors, which are the cathode connector and the anode connector, formed at the front of the printed circuit board are spaced from each other such that the connection between the power connectors and the external circuit is easily performed.

4. The battery module according to claim 1, wherein the sheathing plate is bent such that the sheathing plate covers opposite sides of the printed circuit board.

5. The battery module according to claim 1, further comprising:
- a rectangular lower case including an upper end receiving part in which a plurality of battery cells are sequentially stacked,
- a rectangular upper case including a lower end receiving part for covering the top of the battery cells stacked on the lower case,
- a first circuit unit for electrically connecting the stacked battery cells to each other, the first circuit unit including a sensing board assembly for detecting the voltage and/or current of the battery cells,
- a second circuit unit electrically connected to the first circuit unit, the second circuit unit including a main board assembly for controlling the overall operation of the battery module, and
- a third circuit unit electrically connected to the second circuit unit, the third circuit unit being connected to an external output terminal while preventing the overcurrent.

6. The battery module according to claim 5, wherein
the first circuit unit includes connection terminals for connecting the battery cells in parallel or series with each other, the sensing board assembly of the first circuit unit receives voltage and current signals from the respective battery cells and detects the temperatures of the battery cells, and the first circuit unit is mounted to the front of the battery module adjacent to electrode terminals of the battery cells,
the second circuit unit is mounted to the upper case, and
the third circuit unit includes a switching element for controlling the overcurrent during the charge and discharge of the battery cells, and the third circuit unit is mounted at the rear of the battery module opposite to the electrode terminals of the battery cells.

7. The battery module according to claim 6, wherein the battery module interface is mounted to the rear of the battery module where the third circuit unit is located.

8. The battery module according to claim 7, wherein the battery module is provided at one side of the rear thereof with a connection member including power connectors and a communication connector ('module connectors') connected to the rear connectors of the battery module interface.

9. The battery module according to claim 8, wherein an anode of the first circuit unit is connected to the anode connector of the connection member by a wire, and a cathode of the first circuit unit is connected to the cathode connector of the connection member, via the third circuit unit, by a wire.

10. The battery module according to claim 8, wherein a communication port, for voltage detection, of the sensing board assembly of the first circuit unit is connected to the communication connector of the connection member, via the second circuit unit.

11. The battery module according to claim 8, wherein the third circuit unit is located at one side of the rear of the battery module, and the connection member is spaced a predetermined distance from the third circuit unit.

12. The battery module according to claim 8, wherein the connection member is constructed in a structure in which the module connectors are mounted on a generally "¬"-shaped supporting member toward the battery module interface, and the supporting member is provided at the rear thereof with coupling protrusions, by which the supporting member is mechanically coupled to the battery module.

13. A battery pack comprising a plurality of the battery modules according to claim 1.

14. The battery pack according to claim 13, wherein the battery modules are connected in series and/or parallel with each other by battery module interfaces mounted to the respective battery modules.

15. The battery pack according to claim 13, wherein the battery pack is used as a charging and discharging power source for electric vehicles.

* * * * *